June 25, 1957 W. S. TOUCHMAN 2,796,762
ENGINE FUNCTION EFFICIENCY METER
Filed Nov. 3, 1953 2 Sheets-Sheet 1
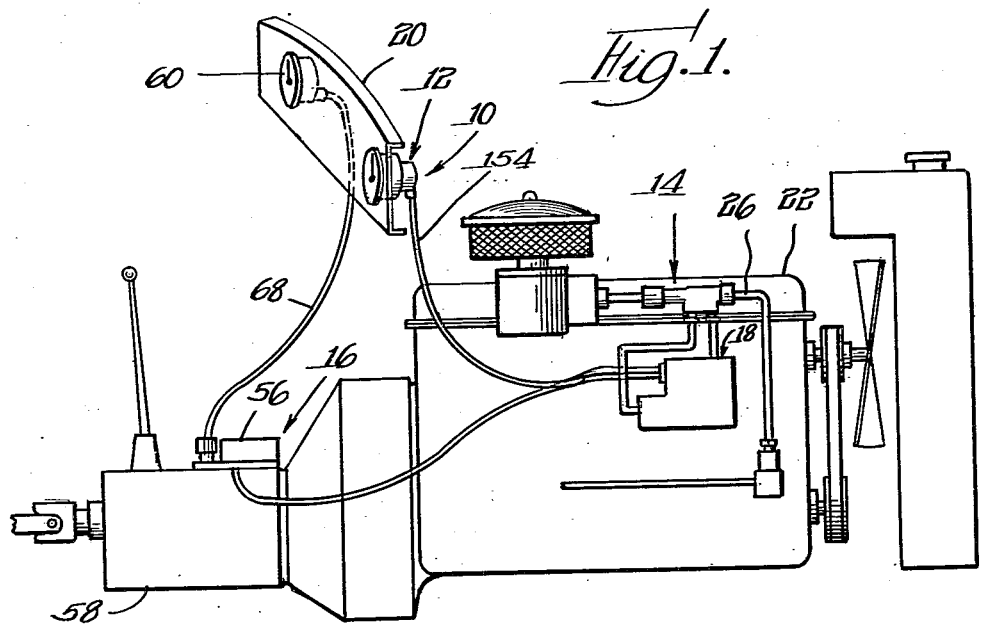
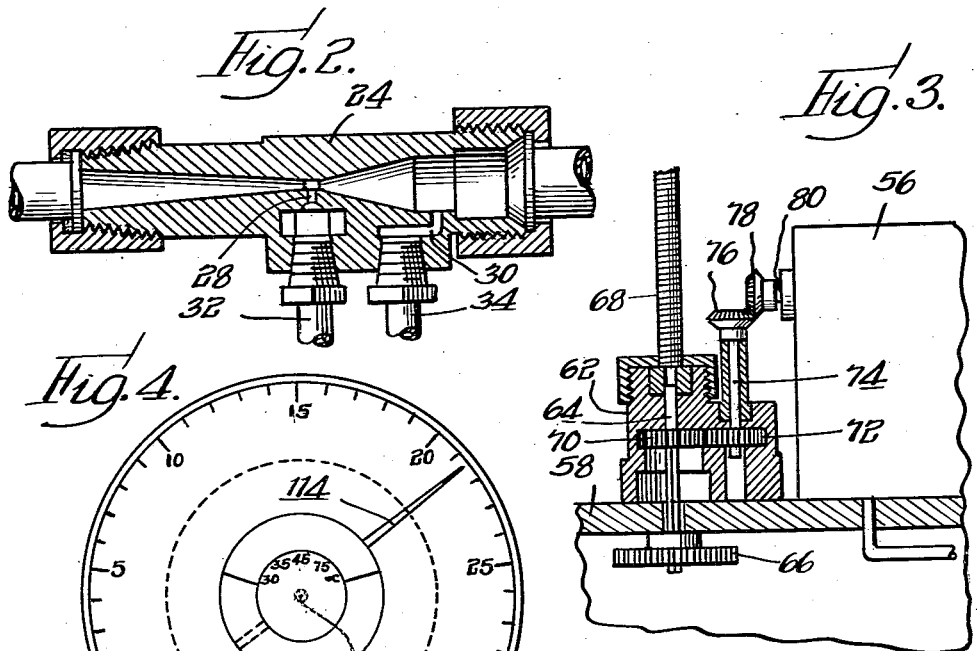
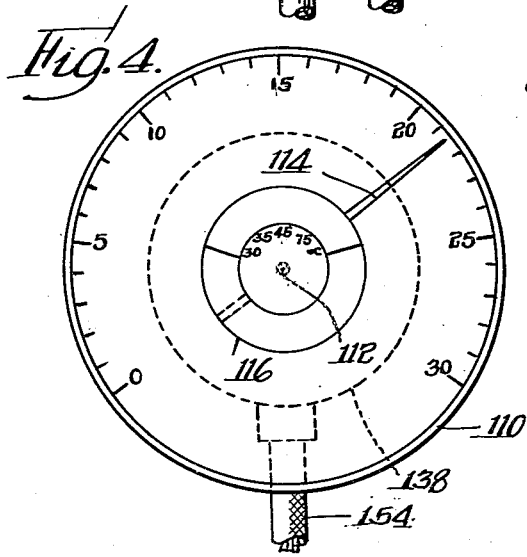
INVENTOR.
William S. Touchman
BY
Olson & Trexler
attys June 25, 1957 W. S. TOUCHMAN 2,796,762
ENGINE FUNCTION EFFICIENCY METER
Filed Nov. 3, 1953 2 Sheets-Sheet 2
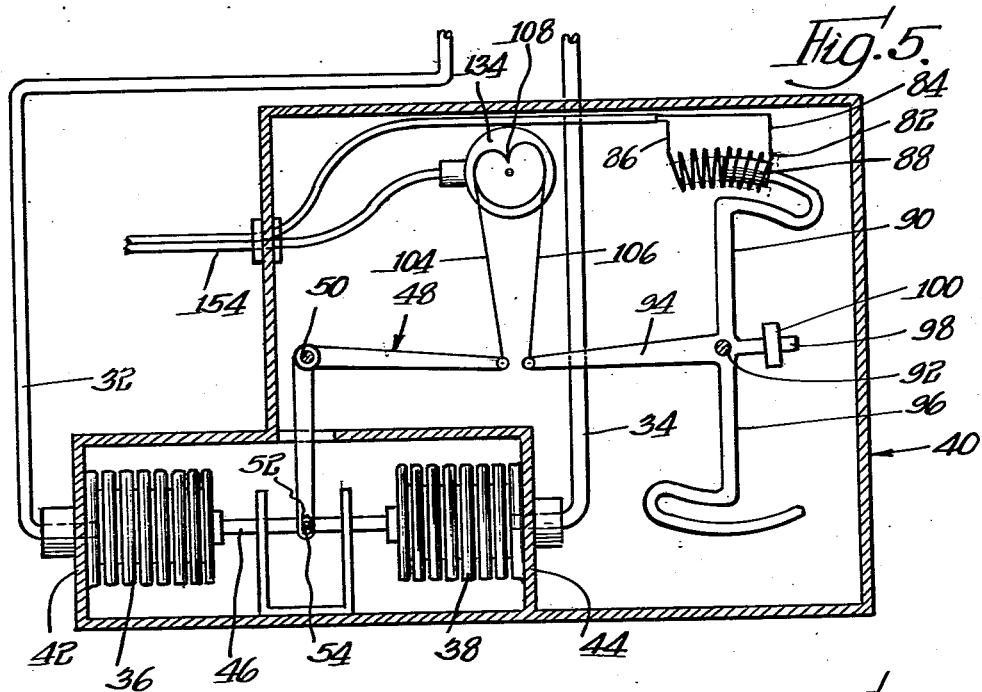
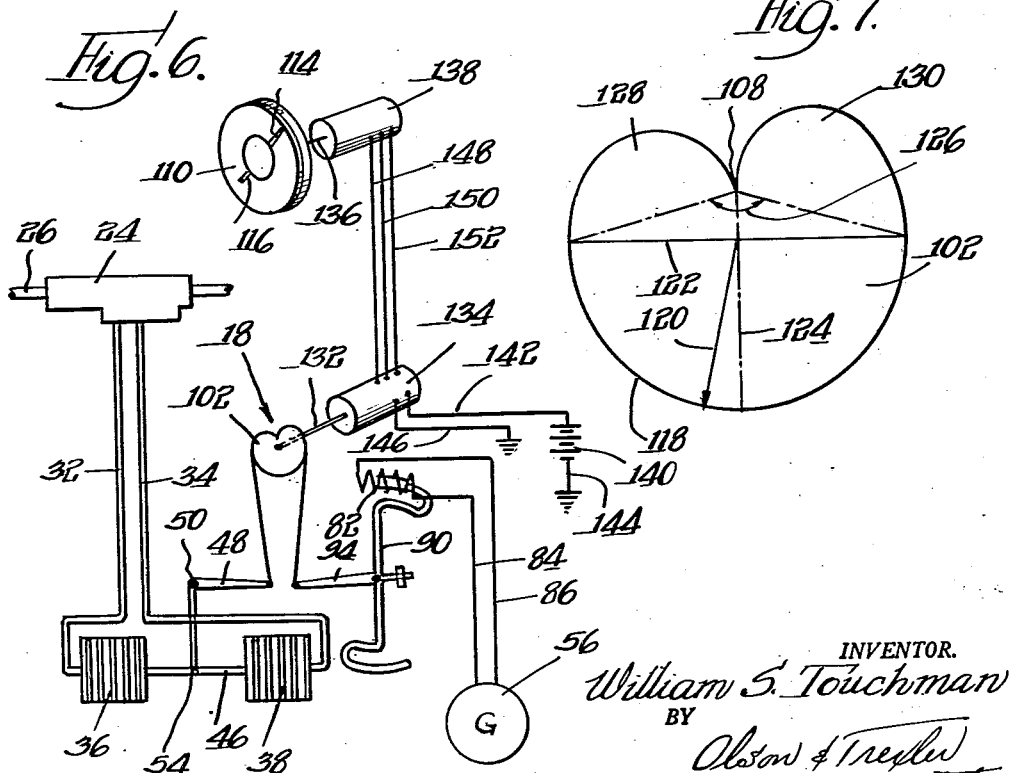
INVENTOR.
William S. Touchman
BY
Olson & Tresler
attys.

United States Patent Office 2,796,762
Patented June 25, 1957

2,796,762

ENGINE FUNCTION EFFICIENCY METER

William S. Touchman, Yellow Springs, Ohio, assignor to Perc C. Sorenson and Lee Jewell, Wauwatosa, Wis.

Application November 3, 1953, Serial No. 390,038

2 Claims. (Cl. 73—114)

The present invention relates to a novel engine efficiency meter, and, more particularly, to a novel meter adapted to be used in connection with vehicles such as automobiles, trucks, airplanes and boats, to indicate miles per gallon.

Engine efficiency or miles per gallon meters have heretofore been suggested, and some of these meters have been subject to several disadvantages. For example, some miles per gallon meters have been relatively bulky and difficult to install at a convenient location such as the dashboard or the instrument panel of the vehicle. In addition, some meters include a mechanism responsive to fuel flow, which mechanism is actuated by fuel under pressure passing thereto from the engine fuel line. When such mechanism is located at the dashboard or otherwise in the passenger compartment of the vehicle, a fire hazard is created in the event of fuel leakage. Furthermore, such mechanisms located in the passenger compartment of the vehicle usually require priming, so that installation and maintenance are made increasingly difficult.

An object of the present invention is to provide a novel efficiency meter or miles per gallon indicator which is relatively compact and may be easily installed in the vehicle, and which includes an indicating unit adapted to be located in the passenger compartment of the vehicle and operated by forces created in response to engine performance and fuel flow, which forces may be created at a location outside of the passenger compartment and transmitted to the indicating unit without requiring the transmission of fuel to the indicating unit whereby to eliminate any fire hazard in the passenger compartment and any necessity for priming.

Another object in the present invention is to provide a novel engine efficiency or miles per gallon meter which includes means for creating forces in response to engine performance and fuel flow, which forces may be transmitted to an indicating device in a vehicle passenger compartment without requiring complicated or bulky force transmitting means whereby to facilitate installation of the meter.

Still another object of the present invention is to provide a novel engine efficiency or miles per gallon meter of the above described type which may be provided with an indicating dial having uniform calibrations to facilitate reading thereof.

Other objects and advantages of the present invention will become apparent from the following descriptions and the accompanying drawings wherein:

Fig. 1 is a somewhat diagrammatic view illustrating an engine efficiency meter embodying the principles of this invention installed on a vehicle engine;

Fig. 2 is a fragmentary cross sectional view of a venturi adapted to be inserted in the engine fuel line and forming a part of the engine efficiency meter;

Fig. 3 is a fragmentary cross sectional view illustrating the manner in which the means for creating the force in response to engine performance may be driven by the engine transmission;

Fig. 4 is an elevational view of the indicator unit utilized by the present invention;

Fig. 5 is a vertical cross sectional view showing the novel means of this invention for combining forces created in response to fuel flow and engine performance;

Fig. 6 is a diagrammatic view of a miles per gallon or engine efficiency meter embodying the principles of this invention; and Fig. 7 is an enlarged elevational view of the forces combining cam member utilized in the present invention.

Referring now more specifically to the drawings, wherein like parts are designated by the same numerals throughout the various figures, an engine efficiency meter 10 embodying the principles of this invention includes an indicating head 12, means 14 for creating a force in response to fuel flow, means 16 for creating a force in response to engine performance and means 18 for combining these forces and actuating the indicator head. As shown best in Fig. 1, the indicator head 12 is adapted to be located in the vehicle passenger compartment and, more particularly, on the dashboard or instrument panel 20. The means for creating forces in response to fuel flow and engine performance and the means for combining these forces are located outside of the vehicle passenger compartment and preferably adjacent to engine 22.

Referring now specifically to Figs. 1, 2, 5 and 6, it is seen that the means 14 for creating a force in response to fuel flow includes a venturi 24 inserted in the engine fuel line 26. The venturi is provided with openings 28 and 30 at longitudinally spaced points and tubes or conduits 32 and 34 are respectively connected with these openings. The opposite end of the tube 32 is connected with a hermetically sealed flexible bellows 36 and the tube 34 is connected with a similar bellows 38. As shown best in Fig. 5, these bellows may conveniently be mounted in a housing 40, which housing is preferably disposed adjacent and below the venturi. One end of the bellows 36 is rigidly secured to a fixed wall 42 of the housing and the bellows 38 is also fixed to a wall 44 of the housing. The free ends of the bellows are interconnected by a rod 46 so that the rod moves in accordance with any expansion or contraction of the bellows. A bell crank 48 is pivotally mounted within the housing 40 as at 50 and one arm of the bell crank is provided with a slot 52 which receives a pin 54 fixed to the connecting rod 46. With this structure, it is seen that the bell crank 48 is actuated upon any movement of the connecting rod 46. As will be understood, fluid under one pressure is conducted from the venturi through the opening 28 to the bellows 36 and fluid or fuel under a different pressure is conducted from the venturi through opening 30 to the bellows 38. The bellows 36 and 38 expand or contract in accordance with the fluid pressures therein and a connecting rod 46 and thus the bell crank 48 will be moved in accordance with the difference between the pressures in the bellows 36 and 38. Since the fluid pressures at the spaced openings in the Venturi are proportional to the square of the rate of fuel flow, it is obvious that a force is created tending to move the bell crank 48, which force is proportional to the square of the rate of fuel flow.

In accordance with a feature of this invention, the means 16 for creating a force in response to engine performance includes a voltage generator 56 which is adapted to be driven from the engine transmission so that the voltage generated is proportional to engine performance or speed. As shown best in Figs. 1 and 3, the generator 56 is preferably located at the engine transmission 58 and is connected with a modified take-off drive for a standard speedometer 60. A take-off drive includes a housing 62 mounted on the transmission 58 in which housing is journaled a shaft 64. The shaft 64 projects into the transmission and a gear 66 secured to the shaft for meshing engagement with a gear in the transmission. The upper end of the shaft 64 is connected with the speedometer by a flexible drive shaft 68 in the usual manner. In order to drive the generator, a second gear 70 is fixed on the shaft 64 and meshes with a gear 72 which gear 72 is connected with a drive shaft 74. A bevelled gear 76 is secured to the upper end of the shaft 74 for engagement with a gear 78 fixed on the generator armature shaft 80. With this structure, it is seen that the generator will be driven at a speed which is proportional to engine performance and thus within the range of generator speeds contemplated herein, the voltage output of the generator will be substantially directly proportional to engine performance.

The electrical energy produced by the generator 56, which may be either a D. C. or A. C. generator, is directed to a coil or solenoid 82 through wires 84 and 86 as shown best in Figs. 5 and 6. The coil 82 is fixed in any suitable manner within the housing 40 and a soft iron core 88 is disposed for movement within the coil. The core is fixed to the end of a bell crank arm 90, which bell crank is pivoted about point 92 and includes another arm 94 extending toward the above mentioned bell crank 48. Preferably the bell crank is dynamically balanced for movement around the point 92 by providing a depending arm 96 which balances the arm 90, and arm 98 having the weight 100 thereon which balances the arm 94. The bell crank arm 90 is preferably made from a non-magnetic material and, as will be understood, a magnetic force will be created within the coil or solenoid 82 in response to the voltage produced by the generator 56, which magnetic force tends to draw the soft iron core 88 toward the left, as viewed in Fig. 5, so as to rotate the bell crank arm 92 in a counterclockwise direction. Since the force tending to rotate the above described bell crank 48 is proportional to the square of the fuel flow through the Venturi, the generator 56, coil 82 and soft iron core 88 are constructed so that the magnetic pull on the core is proportional to the square of the generator speed and thus proportional to the square of engine performance.

In order to combine the forces tending to rotate the bell crank 48 and the bell crank arm 94, a cam 102 is pivotally mounted within the housing 40, and flexible wires 104 and 106, or the like, are connected to anchor point 108 on the cam and to bell crank 48 and bell crank arm 94 respectively. This cam is constructed in a manner described below so that within a certain range it will move a lineal distance directly proportioned to the ratio between fuel flow and engine performance. With this arrangement, the miles per gallon indicator of this invention may be provided with a dial 110 having equally spaced calibrations through, for example, the range between zero and 30 miles per gallon. Such a dial is illustrated in Fig. 4 and it is obvious that by providing the dial with equal calibrations, reading thereof will be greatly facilitated. In addition to the outer equally spaced calibrations, the dial may be provided with inner smaller calibrations ranging from 30 miles per gallon to infinity. A pointer pivotally mounted about point 112 is provided with a large finger 114 for cooperating with the outer calibrations and a short finger 116 for cooperating with the inner calibrations. During normal operation, the finger 114 will usually be disposed to indicate a miles per gallon reading of between zero and 30 and, in certain special instances, such as when the vehicle is coasting while the engine is idling, the pointer will revolve so that the finger 114 passes the 30 miles per gallon mark and the finger 116 is positioned in cooperative relationship with the inner scale to give approximate miles per gallon readings up to infinity.

To provide operation of the pointers, as described in the preceding paragraph, the cam 102 is shaped as shown best in Fig. 7 wherein the cam is disposed in a position which will locate the pointer finger 114 to indicate a reading of 22.5 miles per gallon. The cam has a circular portion 118 defined by a radius 120 below a horizontal center line 122. The anchor point 108 for the flexible force transmitting members 104 and 106 is disposed on the vertical center line 124 so that the angle 126 subtended by the horizontal center line is approximately 145°. Lobe portions 128 and 130 between the horizontal center line and the anchorage point are shaped to conform to the scales on the dial so as to provide effective force or torque arms inversely proportional to the applied forces for the scale indication at each cam position.

In accordance with the present invention, the pointer at the dial is moved with the cam 102 by connecting the pointer and cam with a selsyn transmitter and receiver. Thus, as shown best in Fig. 6, the cam 102 is fixed to the armature shaft 132 of a selsyn transmitter 134 and the pointer is fixed to the armature shaft 136 of a selsyn receiver 138. For the purpose of illustrating the present invention, a D. C. selsyn three-wire system has been schematically shown in Fig. 6, with the transmitter 134 connected to a battery 140 by wire 142. The battery is grounded by wire 144 and the selsyn transmitter is also grounded by wire 146. The transmitter 134 and the receiver 138 are connected by wires 148, 150 and 152. The selsyn system may be of any conventional construction and, therefore, the details of this system need not be described and, furthermore, it is understood that an A. C. selsyn system may, in many cases, be substituted for the D. C. system. By utilizing the selsyn system to connect the indicator pointer with the cam, the indicator head 12, which includes the dial 110 and the selsyn receiver 138 may be constructed so that it is compact and so that it may be easily installed in the instrument panel 20. Furthermore, the connecting wires 148, 150 and 152 may be combined within a single insulating cable 154 as shown in Fig. 5, so that they may be directed from the Selsyn transmitter in the motor compartment to the Selsyn receiver in the instrument panel, or dashboard, relatively easily.

The operation of the above described apparatus is as follows. A force tending to rotate the bell crank 48 in a clockwise direction, as viewed in Fig. 5, is created in response to the fuel flow by means of the Venturi and the flexible bellows 36 and 38. Another force tending to rotate the bell crank arm 94 in a counterclockwise direction is created by means of the above described generator 56, coil 82 and soft iron core 88. As set forth above, these forces are respectively proportional to the square of the fuel flow and to the square of engine performance or speed and the forces are applied in opposite directions to the cam 102 through the flexible tapes or wires 104 and 106. The cam which is constructed so that the effective torque arms thereof vary relative to each other as the cam rotates combines the forces applied by the flexible wires 104 and 106 and is rotated by these forces until the relationship between the torque arms are such that forces are balanced. As the cam rotates, the armature of the selsyn transmitter unit 134 also rotates and, as is understood, the armature of the selsyn receiver unit follows in movement of the transmitter armature. Thus, the pointer on the indicator dial is moved in accordance with any movement of the cam 102 to provide a continuous indication of engine efficiency.

From the above description, it is seen that the present invention has provided a novel engine efficiency meter which includes an indicator head having an easily readable dial and being relatively compact so that it can easily be installed at a desired location in a vehicle passenger compartment. Furthermore, it is seen that the present invention provides a novel engine efficiency meter constructed so that the means for creating a force in response to fuel flow may be located outside of the passenger compartment and, more particularly, adjacent the engine in a manner to eliminate any necessity for priming and also to eliminate fire hazards in the passenger compartment. The present invention has also provided an engine efficiency meter wherein complicated and bulky means for transporting forces considerable distances have been eliminated and, more particularly, wherein electrical means are provided for transmitting such forces to remote points.

While the preferred embodiment of the present invention has been illustrated and described herein, it is obvious that many details may be changed without departing from the spirit and scope of the appended claims.

The invention is claimed as follows:

1. An engine function efficiency meter, comprising hydraulic means connected with a fuel line for creating a force proportional to the square of the rate of fuel flow to the engine, remotely positioned means for providing variable amounts of electrical energy in accordance with engine performance, electrical means adjacent said hydraulic means and electrically connected with said remotely positioned means for creating a force substantially proportional to the square of the rate of engine performance, pivotally mounted cam means adjacent said force creating means for combining said forces and movable lineally a distance substantially directly proportional to the ratio between the rate of fuel flow and engine performance, means respectively connecting said hydraulic and said electrical force creating means and said cam means for applying created forces to the cam means in opposition to each other respectively for positively biasing said cam means in opposite directions, remotely positioned indicating means having a dial and pointer, which dial is provided in part with substantially equally spaced calibrations, electrical means operatively connecting said combining cam means and said indicating means for relatively moving said dial and pointer a lineal distance substantially directly proportional to the ratio between the rate of fuel flow and engine performance.

2. An engine function efficiency meter, comprising hydraulic means for creating a force substantially proportional to the square of the rate of fuel flow to the engine, means for providing variable amounts of electrical energy in response to engine performance, means adjacent said hydraulic means and electrically connected with said last named means for creating a magnetic force substantially proportional to the square of the rate of engine performance, movable cam means adjacent said force creating means for combining said forces and movable in response to said forces lineally a distance substantially directly proportional to the ratio between the rate of fuel flow and engine performance, and means respectively connecting said hydraulic and said magnetic force creating means and said cam means for applying said forces to the cam means in opposition to each other respectively for positively biasing the cam means in opposite directions to position the cam means and thereby provide a determination of engine function efficiency.

References Cited in the file of this patent

UNITED STATES PATENTS

| | | |
|---|---|---|
| 1,958,610 | Connet | May 15, 1934 |
| 2,268,072 | Hansmann | Dec. 30, 1941 |
| 2,395,042 | Flatt | Feb. 19, 1946 |
| 2,422,240 | Jackes | June 17, 1947 |
| 2,454,393 | Leonard | Nov. 23, 1948 |
| 2,500,585 | Sylvander | Mar. 14, 1950 |
| 2,507,442 | Holley et al. | May 9, 1950 |
| 2,587,701 | Davis | Mar. 4, 1952 |

FOREIGN PATENTS

| | | |
|---|---|---|
| 828,920 | France | June 3, 1938 |